S. ROGERS.
Car-Couplings.
No. 140,545.
2 Sheets--Sheet 1.
Patented July 1, 1873.
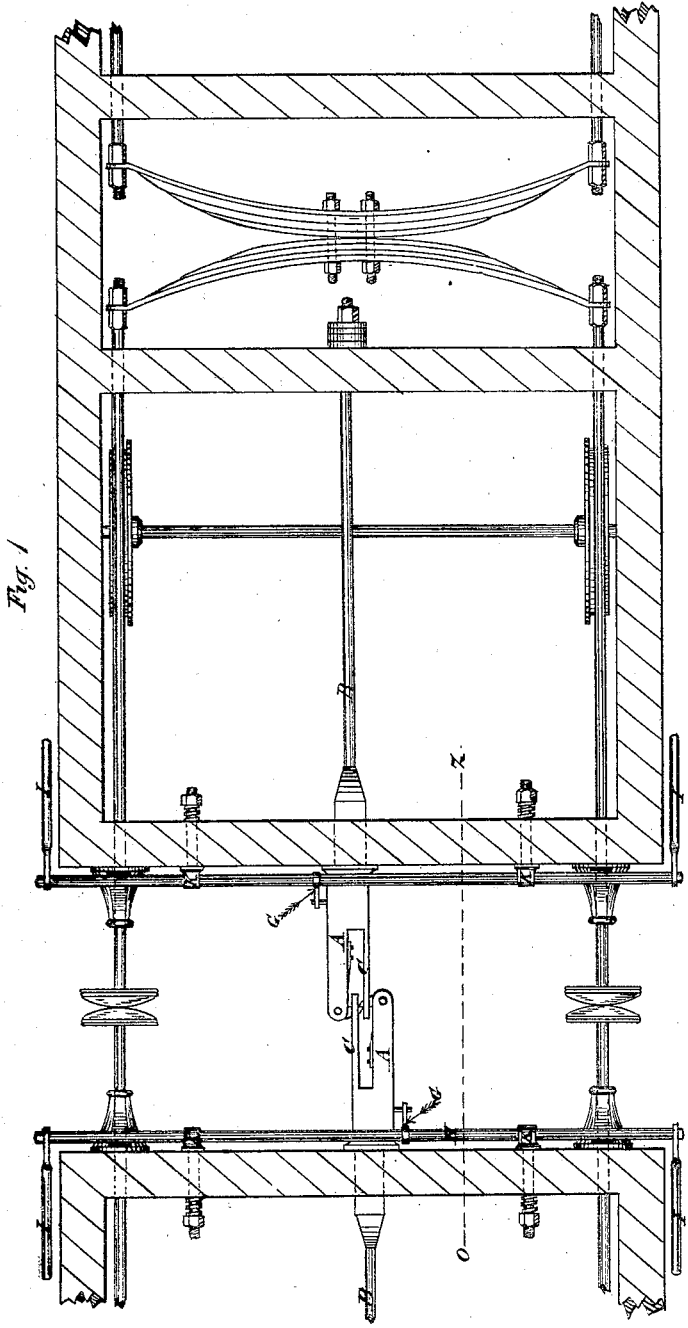
Fig. 1
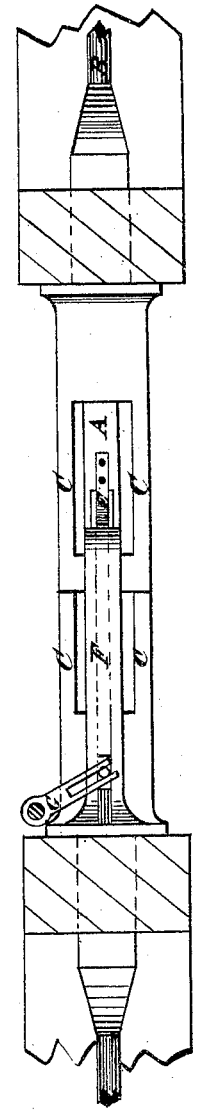
Fig. 3
Silas Rogers
Inventor
By Atty

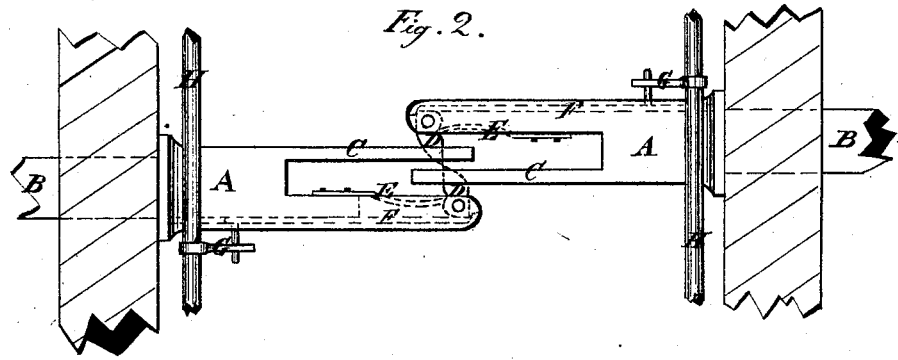
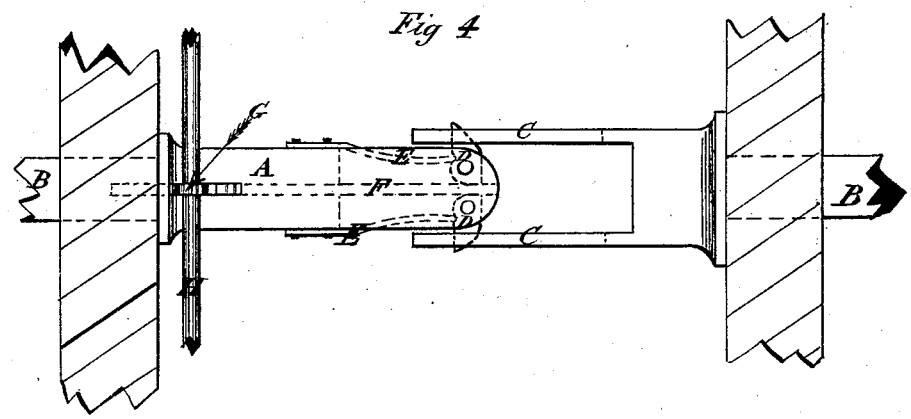
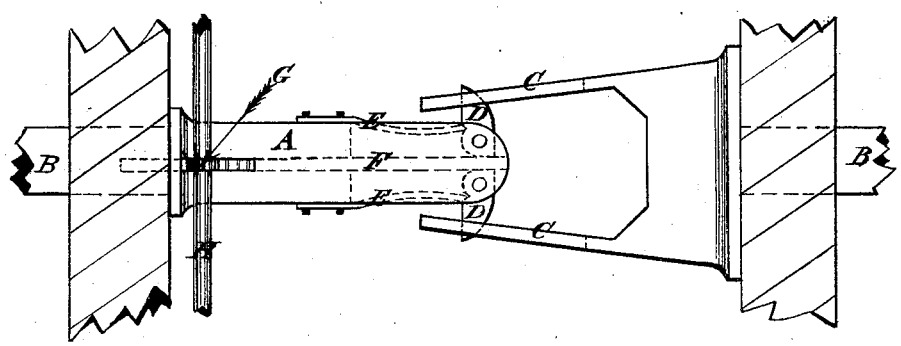

UNITED STATES PATENT OFFICE.

SILAS ROGERS, OF LONDON, ENGLAND, ASSIGNOR OF ONE-HALF HIS RIGHT TO JOHN COATSWORTH, OF SAME PLACE.

IMPROVEMENT IN CAR-COUPLINGS.

Specification forming part of Letters Patent No. 140,545, dated July 1, 1873; application filed September 14, 1872.

*To all whom it may concern:*

Be it known that I, SILAS ROGERS, of London, in the county of Middlesex, England, have invented new and useful Improved Self-Acting Couplings for railway carriages, wagons, and other rolling stock; and I do hereby declare that the following is a full and exact description thereof, reference being had to the figures on the accompanying drawings and to the letters marked thereon.

In the center of one end of the carriage or vehicle is bolted a projecting link or links for the reception of a hook or hooks bolted at the center of the end of the adjoining carriage or vehicle, or a combined hook and link may be fixed to either carriage. The hooks are pivoted on projecting bearings, and work in connection with two springs. A bolt works backward and forward in the bearings by means of a lever or levers fixed at any desired position on the carriage or vehicle. By this means the bolt is moved to and fro so as to leave the hooks free to turn upon their pivots when said bolt is drawn back, or to take up their position for coupling when the bolt is moved forward, and occupies a position at the back of the hook, said hook being kept at right angles to the bearings by the action of the spring.

When the hooks are bolted and the ends of two carriages come together the projecting coupling-links strike the hooks, causing the latter to turn on their pivots, and, when the links have passed a certain distance, the springs, in connection with the hooks, cause the latter to shoot into their links and connect the carriages or vehicles together.

To uncouple or disconnect the hooks and links, the bolt is drawn back by the lever and the carriages are uncoupled.

In the accompanying drawings, Figure 1 is a top view of one arrangement of my self-acting coupling, and of the frame-work of an ordinary railway carriage or wagon. Fig. 2 shows the arrangement shown in Fig. 1 more in detail. Fig. 3 is a side view of Fig. 2; and Figs. 4 and 5 are top views of modifications of my self-acting couplings.

The same letters refer to the same parts in all the drawings.

Referring to Fig. 2, A is the projecting bearing. B is the draw-bar. C is the coupling link or eye. D is the hook, pivoted to the projecting bearing, and working in connection with the spring E. A bolt, F, is worked backward and forward in the bearing by means of a slotted lever-arm, G, attached to a rocking shaft, H, fixed horizontally on the head-stock, and extending from one side of the carriage to the other, or the bolt F may be worked by a cog-wheel, G, fixed to the bar H, as shown in Figs. 4 and 5. Levers I are fixed to the ends of the bar H, by which the rocking motion which works the bolt F is given to the said bar. The bearings K of the bar H are fitted with spiral springs to allow of their giving with the draw-bar B. When the bolt F is drawn back it leaves the hooks D free to turn upon their pivots, and while the bolt F is in this position it is impossible for the carriages to couple.

When the carriages are required to be coupled the levers I are pushed downward, the bolts F being thereby moved forward. The bolts F in being moved forward, coming in contact with the square corners of the hooks D, tilt the hooks into a position at right angles to the bearings, and take up their position behind the said hooks, when it is only possible for the hooks to turn in one direction, *videlicet*, upon the springs E. When the hooks D are thus bolted, and the ends of two carriages come together, the projecting coupling-links C strike against their respective hooks, causing the latter to turn on their pivots; and when the links C have passed a certain distance the springs E, working in connection with the hooks D, cause the latter to shoot into their respective links and connect the two carriages together.

To uncouple or disconnect the carriages the bolts F are drawn back by the action of the levers I, leaving the hooks D free to turn upon their pivots.

It may be found necessary to fix a clamp at the back of the projecting bearing A, containing the hook D to give strength to said bearing.

In Fig. 4, showing a modification of my self-acting couplings, there is a bearing, A, to which are pivoted two hooks, D D, which engage, on the two vehicles to be coupled coming together, with two links, C C, the mode of uncoupling and coupling by the action of the levers I being the same as that in the arrangement illustrated by Fig. 2.

In Fig. 5 is shown a further modification of my coupling, the links C being placed at an obtuse angle with the end of the carriage. These are so placed to accommodate the couplings to curves to prevent strain; and the placing at an angle can be applied to the arrangement shown in Fig. 2.

Having now described my said invention, I claim—

In combination with the hook or hooks D, working in connection with the springs E, the bolt F, and the links C, the rock-shaft A, levers I, and slotted arm or wheel G, all constructed and arranged substantially as set forth.

In testimony whereof I have hereunto set my name in presence of two subscribing witnesses.

SILAS ROGERS.

Witnesses:
  E. T. HUGHES,
  W. A. BARLOW,
    123 *Chancery Lane, London.*